(12) United States Patent
Chopra et al.

(10) Patent No.: US 10,101,908 B1
(45) Date of Patent: Oct. 16, 2018

(54) DYNAMIC STAGING MODEL

(71) Applicant: EMC IP Holding Company LLC, Hopkinton, CA (US)

(72) Inventors: Shelesh Chopra, Bangalore (IN); Meghana Yeledhalli, Bangalore (IN); Anandan Rangaswamy, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/576,060

(22) Filed: Dec. 18, 2014

(51) Int. Cl.
*G06F 3/00* (2006.01)
*G06F 3/06* (2006.01)

(52) U.S. Cl.
CPC .......... *G06F 3/0604* (2013.01); *G06F 3/0647* (2013.01); *G06F 3/0683* (2013.01)

(58) Field of Classification Search
CPC .... G06F 3/0604; G06F 3/0647; G06F 3/0683; G06F 11/1448; G06F 11/1458; G06F 17/30575; G06F 11/1456; G06F 11/1469; G06F 11/1453; G06F 3/0482; G06F 11/2074; G06F 2201/84; G06F 11/1451; G06F 12/16

See application file for complete search history.

(56) References Cited

U.S. PATENT DOCUMENTS

| | | | | |
|---|---|---|---|---|
| 6,560,592 B1 * | 5/2003 | Reid | ................... | G06F 17/3051 |
| 7,447,850 B1 * | 11/2008 | Del Rosso | .......... | G06F 11/1448 |
| | | | | 711/156 |
| 7,496,551 B1 * | 2/2009 | Jalagam | .................... | G06N 5/04 |
| | | | | 706/47 |
| 7,620,658 B2 * | 11/2009 | Benson | ............. | G06F 17/30575 |
| 7,657,582 B1 * | 2/2010 | Cram | ................... | G06F 11/1435 |
| | | | | 707/640 |
| 7,680,831 B1 * | 3/2010 | Gandhi | ............... | H04L 41/0654 |
| | | | | 707/999.2 |
| 8,386,418 B2 * | 2/2013 | Birch | ................ | G06F 17/30312 |
| | | | | 707/602 |
| 2003/0046270 A1 * | 3/2003 | Leung | ............... | G06F 17/30575 |
| 2004/0225670 A1 * | 11/2004 | Cameron | .......... | G06F 17/30589 |
| 2006/0053261 A1 * | 3/2006 | Prahlad | ................. | G06F 3/0605 |
| | | | | 711/162 |
| 2008/0154979 A1 * | 6/2008 | Saitoh | ................. | G06F 11/1461 |
| 2008/0307020 A1 * | 12/2008 | Ko | ....................... | G06F 11/1469 |
| 2009/0254572 A1 * | 10/2009 | Redlich | ................. | G06Q 10/06 |
| 2010/0332452 A1 * | 12/2010 | Hsu | .................... | G06F 17/30156 |
| | | | | 707/640 |
| 2011/0131174 A1 * | 6/2011 | Birch | ................ | G06F 17/30312 |
| | | | | 707/607 |
| 2013/0339298 A1 * | 12/2013 | Muller | ............. | G06F 17/30283 |
| | | | | 707/640 |

(Continued)

OTHER PUBLICATIONS

"EMC Data Protection Advisor for Replication Analysis" EMC, May 2010.*

(Continued)

*Primary Examiner* — Francisco A Grullon
(74) *Attorney, Agent, or Firm* — Van Pelt, Yi & James LLP

(57) ABSTRACT

A set of rules is received, wherein each rule contains at least one criterion to be applied on staging of save sets. A value is determined of a specific save set on a specified device. The specified save set is staged based at least in part on the value.

19 Claims, 6 Drawing Sheets

(56) References Cited

U.S. PATENT DOCUMENTS

2014/0325267 A1* 10/2014 Liu .................. G06F 3/0482
　　　　　　　　　　　　　　　　　　　714/15
2015/0205674 A1* 7/2015 Schroth ............. G06F 11/1458
　　　　　　　　　　　　　　　　　　　707/649
2015/0256617 A1* 9/2015 Klose ................ H04L 67/1095
　　　　　　　　　　　　　　　　　　　709/217

OTHER PUBLICATIONS

"Optimizing Primary Storage Through File Archiving With EMC Cloud Tiering Appliance" EMC, Aug. 2012.*
"Using EMC Data Protection Advisor with EMC Data Domain Deduplication Storage Systems" EMC, Jun. 2010.*
"EMC Documentum Archive Services for SAP" EMC, Oct. 2013.*
"Understanding EMC Avamar with EMC Data Protection Advisor" EMC, Mar. 2010.*
"Enabling Cost Control and Operational Efficiency With EMC Data Protection Advisor" EMC, Aug. 2013.*

* cited by examiner

FIG. 3
(PRIOR ART)

DYNAMIC STAGING MODEL

BACKGROUND OF THE INVENTION

A "save set" is a set of files, directories, and/or filesystems that a user defines for periodic backup. Staging of save sets is a term describing how a system accumulates and migrates multiple save sets progressively from one medium to another. For example, a save set may be staged such that save sets are eventually moved from more expensive media to less expensive media. Current staging algorithms are static, causing inefficiencies in resource management.

BRIEF DESCRIPTION OF THE DRAWINGS

Various embodiments of the invention are disclosed in the following detailed description and the accompanying drawings.

FIG. 3 is an illustration of a user interface to a static staging model.

DETAILED DESCRIPTION

Figure 1:
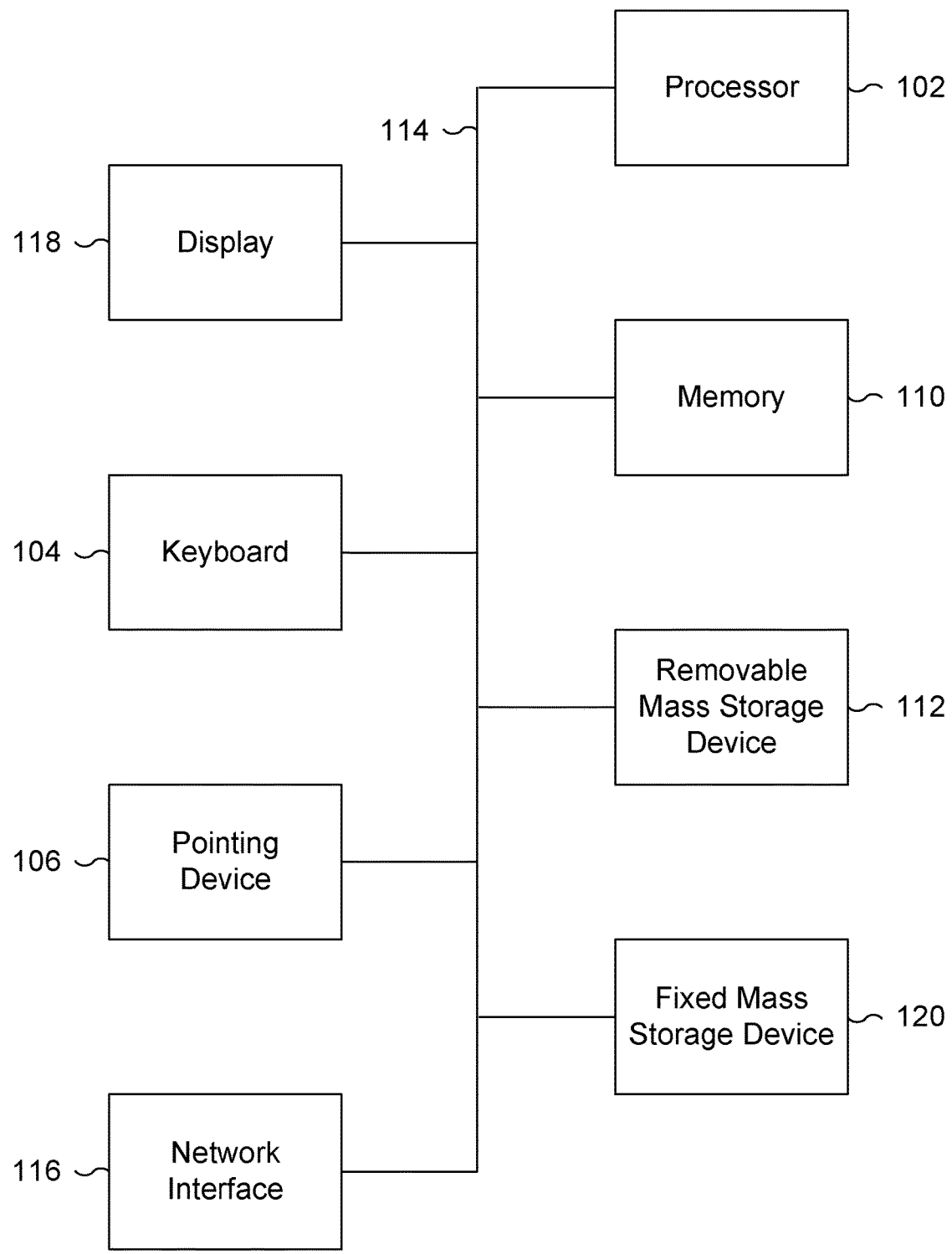
FIG. 1 is a functional diagram illustrating a programmed computer system for distributed workflows in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Dynamic staging models are disclosed. Staging is designed as a complement to hierarchical storage management, enabling Administrators to define policies that automatically move save sets from faster, more expensive media to less expensive media. The expense in media is proportional to one or more of the following: speed, latency, geography, security, robustness, and high availability of the media.

Traditional save set selection algorithms for staging are based on the save set size or save set age. Given recent advances in storage, for example deduplication, these traditional algorithms are less relevant, as they do not use efficient data analysis to check if the save set being staged is being recovered on a regular basis and therefore not an ideal solution for hierarchical storage management. The staging is also triggered periodically regardless of the availability of the host resources. By contrast, dynamic staging encapsulates a philosophy emphasizing a critical consideration of the data's value, before making the decision to stage to less expensive media.

Dynamic staging uses a rules engine to use established or custom rules to apply towards staging. Examples of rules include determining various criteria including:
  a. which save sets have not been restored for the last year;
  b. which save sets have more than one copy on primary storage;
  c. whether an associated retention policy is currently past 75% of its retention period; and
  d. whether a device has only one save set left, and if so, whether it can be moved to another device to reclaim the entire device.

Dynamic staging also permits the selection of devices which should not be scanned for criteria, such that rules would not be imposed for the selected devices.

Dynamic staging recognizes the data's value. For example, selecting save sets that are not frequently being called upon for recovery or that have more than one copy in primary storage greatly improves recovery performance. Staging data that has crossed 75% of its retention period is more efficient system-wide than staging more recent data. Dynamic staging reduces moving data between different media for recovery, improving efficiency. Dynamic staging also may initiate staging outside a backup window to ensure backup performance is not impacted, and/or to give required resources for staging time to complete. Dynamic staging may also stage in partial chunks to accommodate recovery requests on the data being currently accessed. Dynamic staging permits full custom rules selection to effect cost and space optimization and improve total cost of ownership ("TCO") and/or recovery time objective ("RTO") objectives. For example, rules may be established such that data from a CEO of a company is considered higher in value, and thus made more highly available than that of a clerk in the company.

FIG. 1 is a functional diagram illustrating a programmed computer system for distributed workflows in accordance with some embodiments. As shown, FIG. 1 provides a functional diagram of a general purpose computer system programmed to execute workflows in accordance with some embodiments. As will be apparent, other computer system architectures and configurations can be used to execute workflows. Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display 118.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through network interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
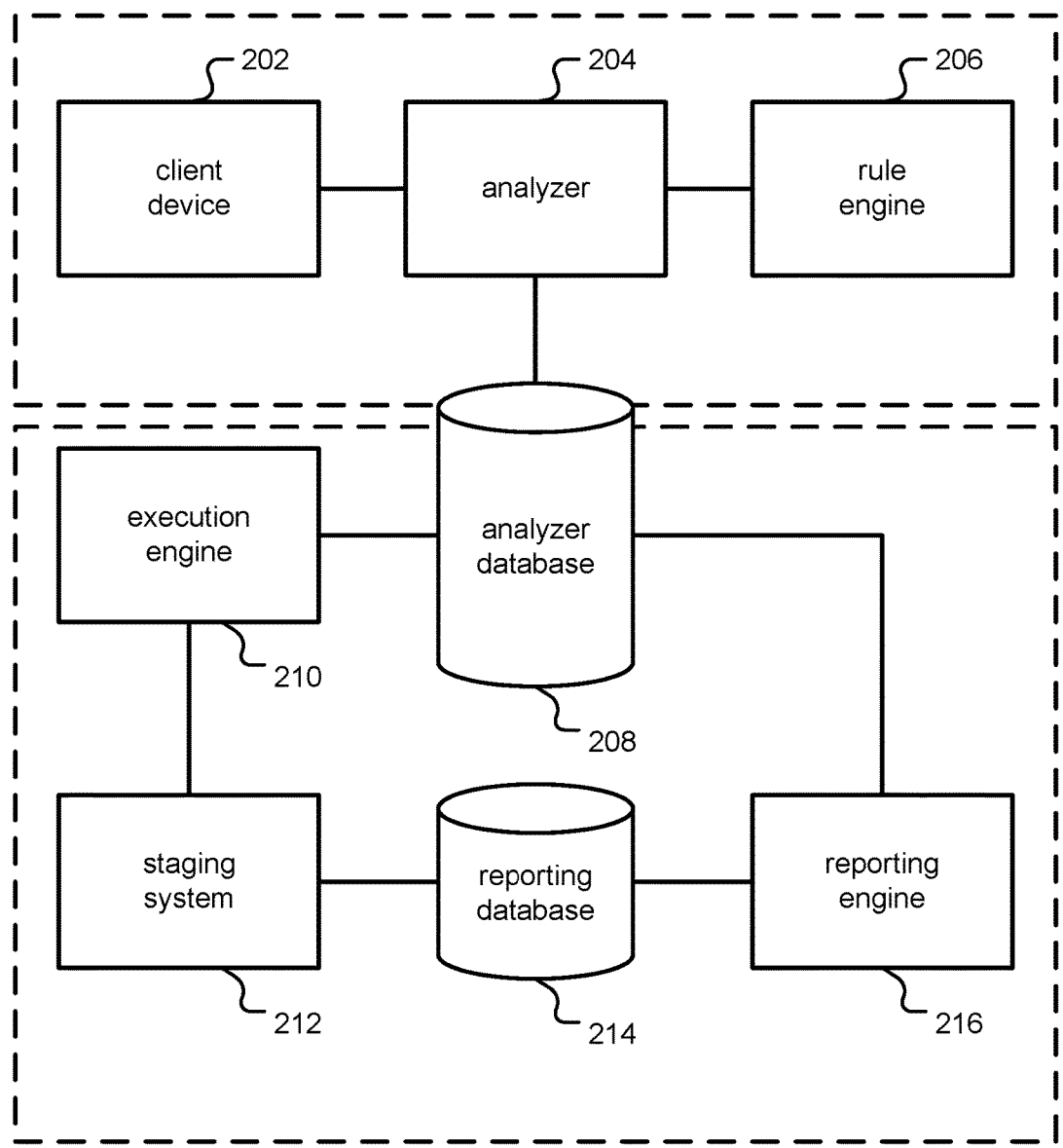
FIG. 2 is a block diagram illustrating an embodiment of a system for dynamic staging.

FIG. 2 is a block diagram illustrating an embodiment of a system for dynamic staging. Client device 202 is a device that at least in part uses backup software of save sets. Client device 202 is coupled to analyzer 204, which is in turn coupled to rules engine 206 and analyzer database 208.

Execution engine 210 is also coupled to analyzer database 208 and staging system 212. The staging system 212 is coupled to a reporting database 214, which is in turn coupled to a reporting engine 216. The reporting engine 216 is coupled to the analyzer database 208 as well.

Rules engine 206 has its own schema used to store criteria for staging. A user, group, and/or system can add, modify, or remove rules. Rules may be stored in a rules database (not shown in FIG. 2). Rules may be simple with a single criterion, or can be cascaded with multiple criteria with a priority order for application of said criteria.

Analyzer 204 communicates with rules engine 206 to validate what save set identification numbers ("SSIDs") may be staged. Throughout this specification, an SSID and its associated save set may be used interchangeably without loss of generality. The analyzer 204 checks if prerequisites for staging are met, in particular if backup or recovery is scheduled at the same time as staging. Analyzer 204 is coupled with analyzer database 208 where analysis is stored for future reference. The database also maintains a queue for save sets candidates eligible for staging.

In one embodiment, a high level schema of analyzer database 208 is:

| Time of Analysis | Device Name(s) | Total SSID in Device | No. of SSID Staging-eligible | Details |
|---|---|---|---|---|
| T0 | /dev/abc | 100 | 25 | Device1: SSID-1 - Not recovered for last 2 years<br>Device1: SSID-2 - Have multiple copies on the similar device<br>Device1: SSID-3 - 90% of retention is passed<br>. . .<br>. . . |
| T1 | /dev/abc1 | 100 | 23 | Device1: SSID-1 - Not recovered for last 2 years |
|  | /dev/abc2 | 100 | 0 | Device1: SSID-2 - Have multiple copies on the similar device<br>Device1: SSID-3 - 90% of retention is passed<br>. . .<br>Device1: SSID-23 - Only 1 SSID on the Device moved for Space Optimization<br>Device2: No Eligible Candidate |
| T2 | /dev/abc3 | 100 | 22 | Device1: SSID-1 - Not recovered for last 2 years<br>Device1: SSID-2 - Not recovered for last 2 years<br>Device1: SSID-3 - Not recovered for last 2 years<br>. . . |
| T3 | /dev/abc4 | 100 | 0 | Device1: No Eligible Candidate |

In the example shown, at time T0, the analyzer 204 determines that for device "/dev/abc", there are 100 save sets (and/or SSIDs) in total, and 25 are candidates eligible for staging. The analyzer database 208 comprises details for each of the save sets by referring to "Device1" (also known as "/dev/abc") that: the first save set, SSID-1, has not been recovered for two years, the second save set, SSID-2, has multiple copies on similar devices, the third save set, SSID-3, has passed 90% of its retention period, and so on. At time T1, the analyzer 204 determines that each of the two devices, including "/dev/abc1" which is referred in that row as "Device1" and device "/dev/abc2" which is referred in that row as "Device2", have 100 SSIDs in total, each. Device1 has 23 save sets eligible for staging while Device2 has no eligible candidate.

Execution engine 210 is schedule to run periodically or on demand. The execution engine 210 accesses information from analyzer database 208 above, determines device-SSID mapping, and creates a worker list to be executed for staging. Staging system 212 determines whether any SSIDs are available for staging; if no, that is reported to the reporting database 214; otherwise the candidate stage operation is executed and the results are stored in reporting database 214.

Reporting engine 216, also known as a notifier engine 216, takes the final status of a dynamic staging and mails and/or projects via different means such as email, mail, dashboards, and so forth. The reporting engine 216 may also give different filter mechanisms to a user to permit custom queries or notification. Examples of reports include:
 a. a report for specified device(s);
 b. a report over any time range;
 c. a report for specified save set(s);
 d. a report on SSIDs that are pending staging;
 e. a report on any failures; and
 f. a report on trends for given device(s).

Figure 3:
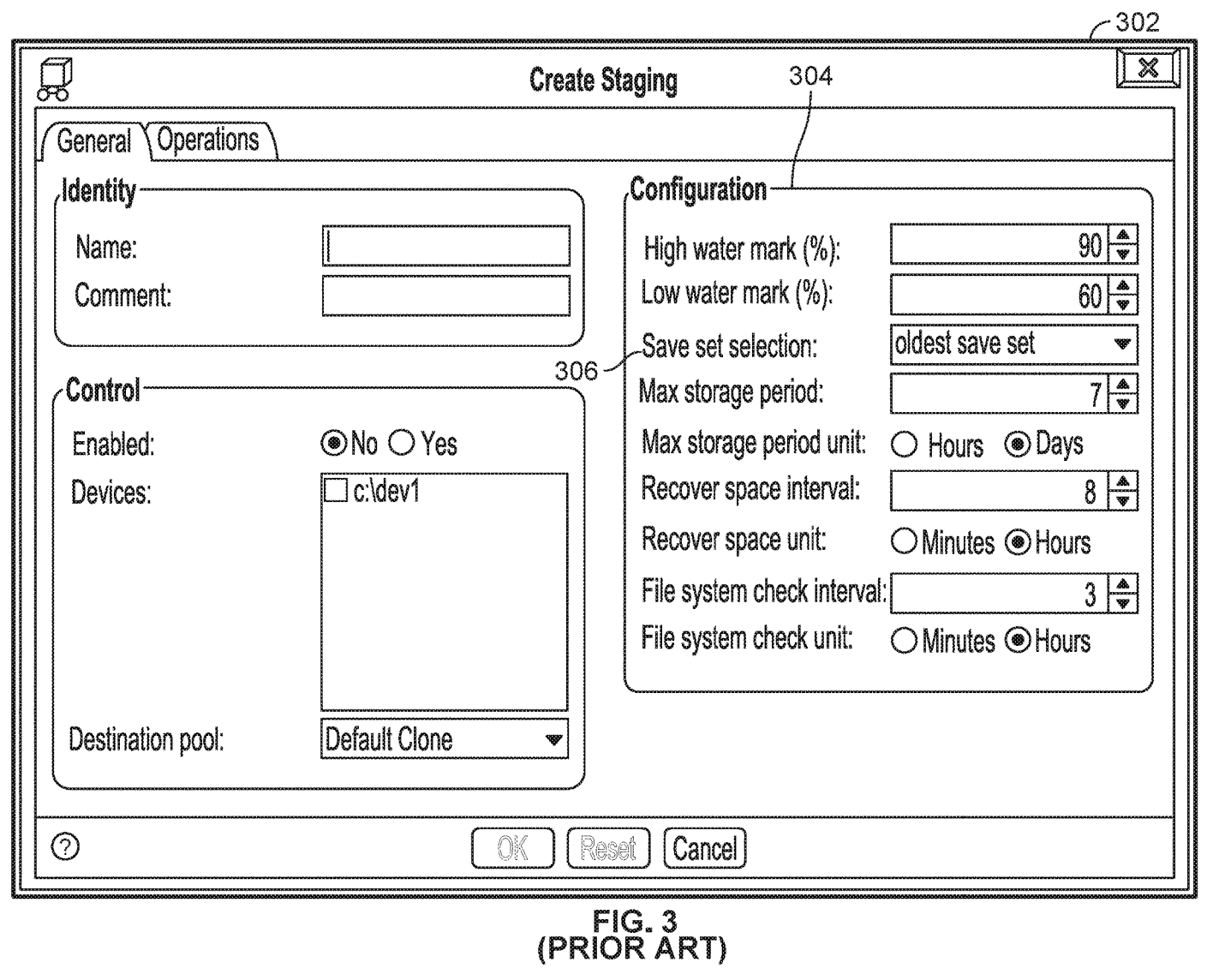

FIG. 3 is an illustration of a user interface to a static staging model. The create staging window 302 traditionally has a set of configuration controls 304, including a set of trigger points and subsequent actions. In the example shown in FIG. 3, trigger points are that staging is actionable when data reaches a high water mark of 90% full on the primary storage, and will continue until data subsides to a low water mark of 60% full. The save set selection 306 is statically set to stage the oldest save set. As well, when a max storage period of 7 days is reached, the save set is staged.

A user, group, and/or system thus by window 302 pre-selects static criteria without considering the value of the underlying data.

Figure 4A:
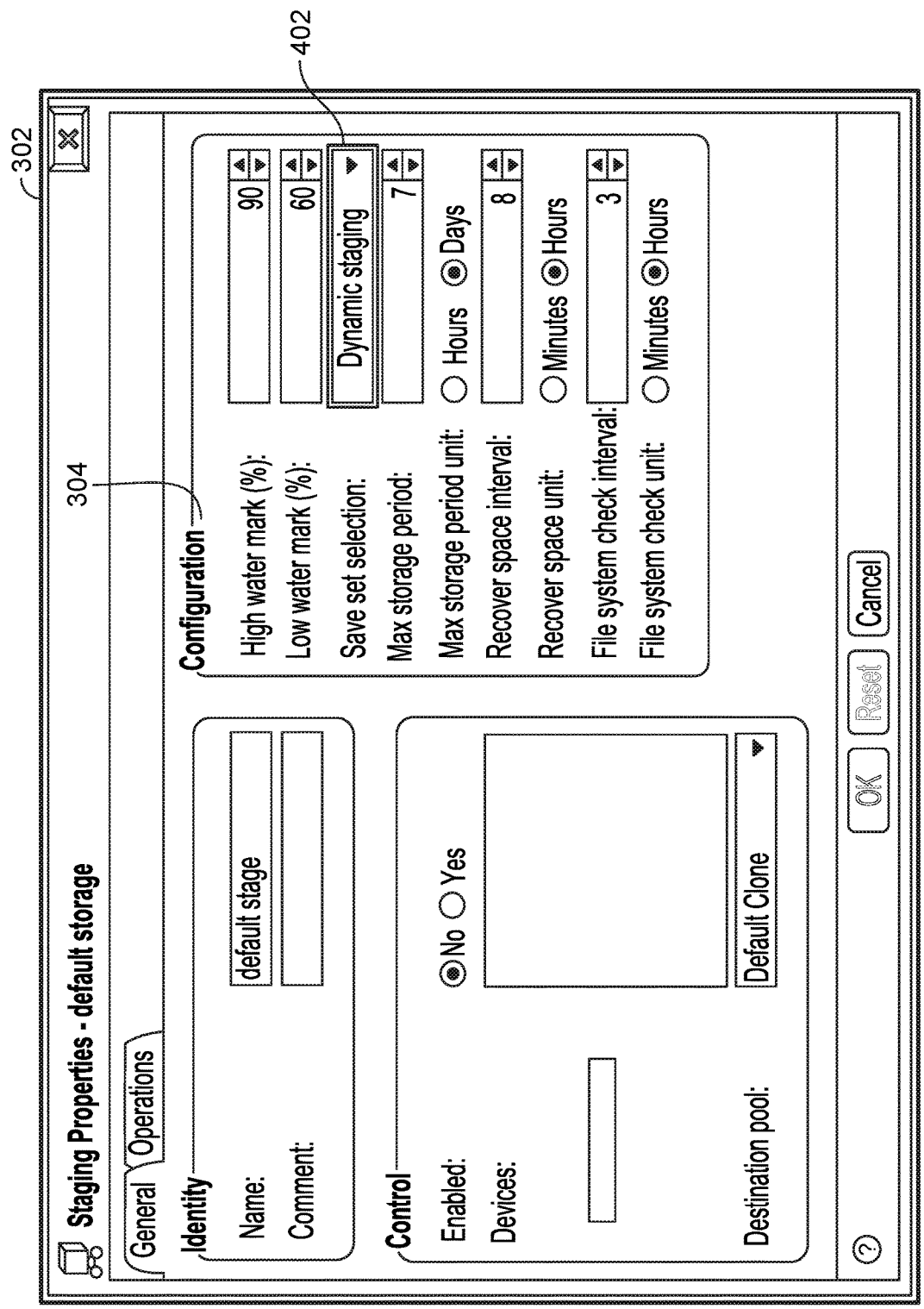
FIGS. 4A and 4B are an illustration of a user interface to a dynamic staging model.
Figure 4B:
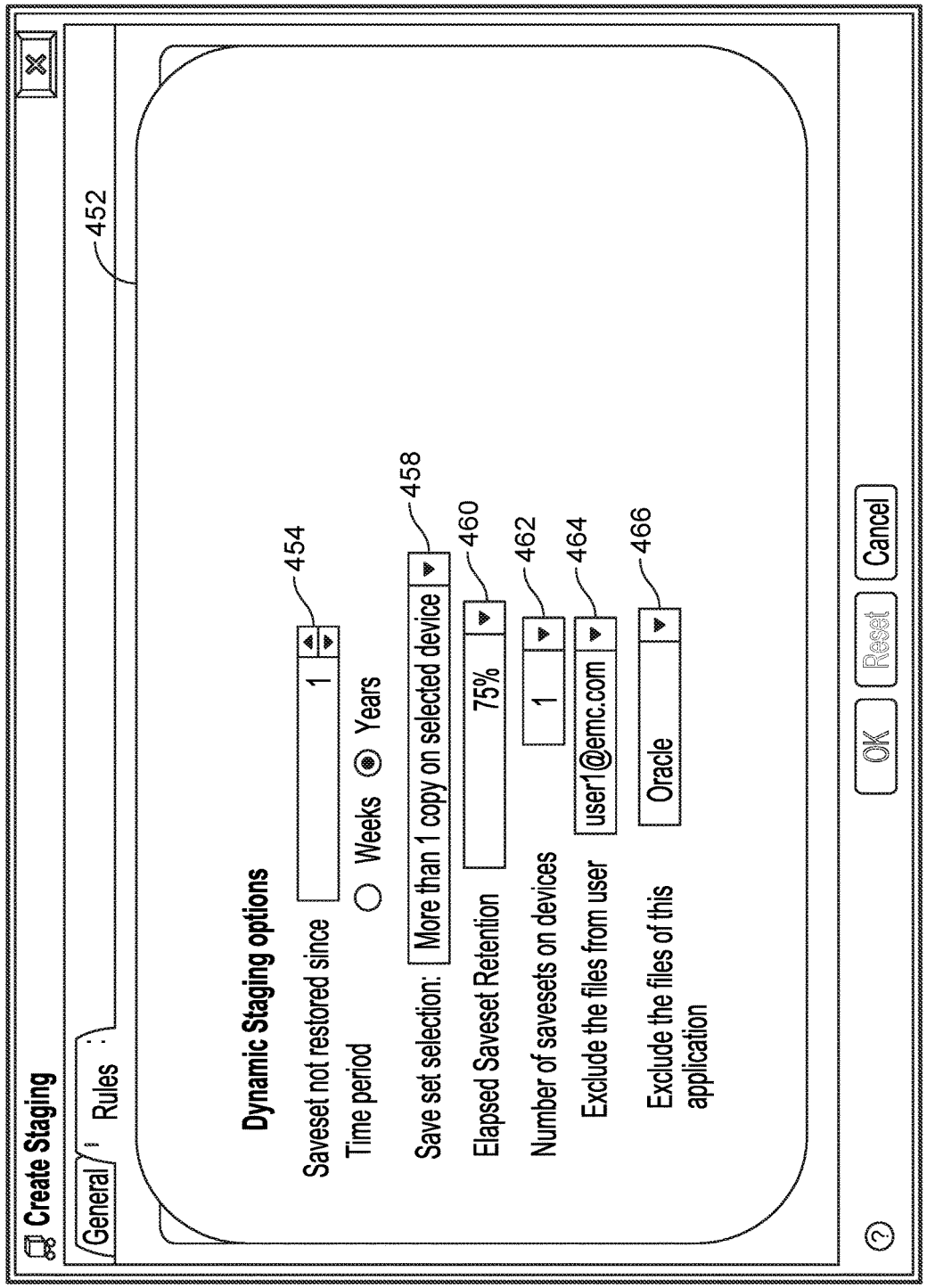

FIGS. 4A and 4B are an illustration of a user interface to a dynamic staging model. In contrast with FIG. 3, within the set of configuration controls 304 there now is a "dynamic staging" save set selection mechanism 402 as shown in FIG. 4A.

The dynamic staging selection 402 leads to dynamic staging rules tab 452 in FIG. 4B. Dynamic staging rules/options examples include:
 a. an interface 454 to a rule weighting data value based on whether a save set has not been restored for a time period, for example one year as shown;
 b. an interface 458 to a rule weighting data value based on whether there is more than X copies on Y devices, for example more than 1 copy on a selected device;
 c. an interface 460 to a rule weighting data value based on a given save set's elapsed retention, for example 75% of a total retention period as a particular elapsed timeframe;
 d. an interface 462 to a rule weighting data value based on the number of save sets on devices, for example if there are one or more of a save set on all devices;
 e. an interface 464 to exclude files from staging analysis if it is from a particular user/group/system, for example from CEO user1@emc.com; and
 f. an interface 466 to exclude files from staging analysis if it is from a particular application, for example from an Oracle database.

Figure 5:
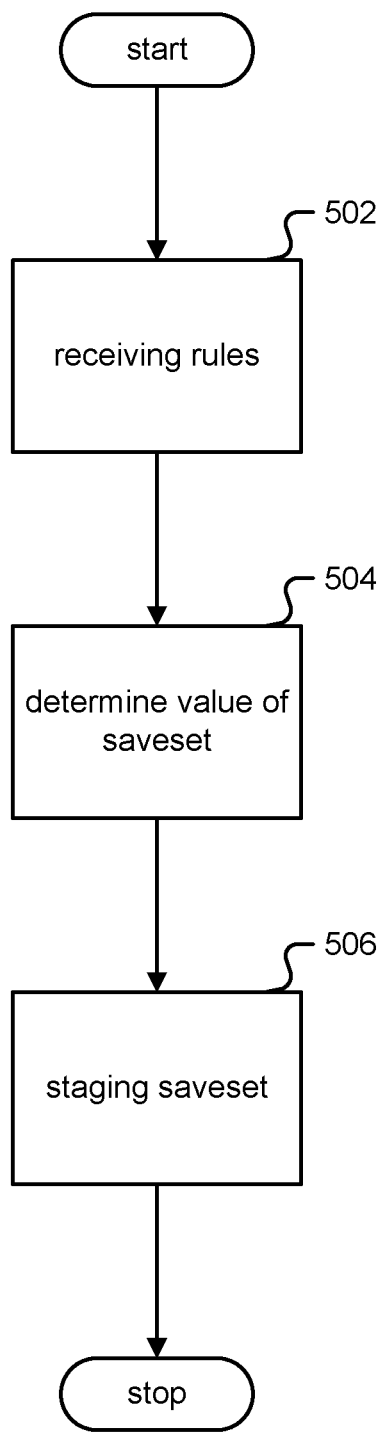
FIG. 5 is a flow chart illustrating an embodiment of a method for dynamic staging.

FIG. 5 is a flow chart illustrating an embodiment of a method for dynamic staging. In one embodiment, the method of FIG. 5 is implemented in the system shown in FIG. 2.

At step 502, a set of rules is received, wherein each rule contains at least one criterion to be applied on staging of save sets. The set of rules may include two or more rules. The set of rules may include a rule that affects the value if the specific save set has not been restored for a period of time, if the specific save set has not been restored for a number of years, if the specific save set has more than one copy on a primary storage device, if a user or group associated with the specific save set is important, if a retention period of the specific save set has been consumed by more than a set percentage, and/or if the specified device has less than a set number of save sets left stored. In one embodiment, rules may be related to one or more of the following:

a. data set type (for example, do not stage anything that is a record and/or database, do stage a file system);
b. staging based on whether a save set is dependent on other save sets;
c. size of a save set; and
d. value of a save set.

At step 504, a rules engine 206 is used at least in part to determine a value of a specific save set on a specified device. The value may be related to economic value of data associated with the specific save set, costs of recovering data associated with the specific save set, recovery performance of system data, high availability requirements of system data, TCO, and/or RTO.

At step 506, the specified save set is staged based at least in part on the value. In one embodiment, a further step (not shown) uses analyzer 204 for staging the specified save set in the event no backup or recovery is scheduled for the specified device. In one embodiment, a further step (not shown) an execution engine 210 is scheduled to perform staging on demand. In one embodiment, a further step (not shown) an execution engine 210 is scheduled to perform staging periodically. In one embodiment, a further step (not shown) an execution engine 210 is scheduled to perform staging in parts.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a set of rules, wherein each rule contains at least one criterion to be applied on staging of save sets, wherein each save set is a set of files, directories, and/or filesystems that a user defines for periodic backup and wherein each save set is associated with its own save set identification number (SSID);
   using a rules engine at least in part to determine a value of a specific save set on a specified device based at least in part on the set of rules;
   analyzing and storing in a database data associated with a schema, wherein the schema comprises a time of analysis and a set of details on when each stage-eligible save set was last recovered, and wherein analyzing includes validating whether a given SSID may be staged;
   wherein the set of rules includes a rule that affects the value if an associated set of details for the associated time of analysis in the database indicates the specific save set has not been restored for a period of time; and
   in the event the given SSID is validated and may be staged, staging a save set associated with the given SSID from a more expensive media to a less expensive media based at least in part on the value.

2. The method as recited in claim 1, wherein the set of rules includes two or more rules.

3. The method as recited in claim 1, wherein the set of rules includes a rule that affects the value if the specific save set has not been restored for a number of years.

4. The method as recited in claim 1, wherein the set of rules includes a rule that affects the value if the specific save set has more than one copy on a primary storage device.

5. The method as recited in claim 1, wherein the set of rules includes a rule that affects the value if a user or group associated with the specific save set is important.

6. The method as recited in claim 1, wherein the set of rules includes a rule that affects the value if a retention period of the specific save set has been consumed by more than a set percentage.

7. The method as recited in claim 1, wherein the set of rules includes a rule that affects the value if the specified device has less than a set number of save sets left stored.

8. The method as recited in claim 1, further comprising using an analyzer for staging the specified save set in an event no backup or recovery is scheduled for the specified device.

9. The method as recited in claim 1, further comprising scheduling an execution engine to perform staging on demand.

10. The method as recited in claim 1, further comprising scheduling an execution engine to perform staging periodically.

11. The method as recited in claim 1, further comprising scheduling an execution engine to perform staging in parts.

12. The method as recited in claim 1, wherein the value is related to economic value of data associated with the specific save set.

13. The method as recited in claim 1, wherein the value is related to costs of recovering data associated with the specific save set.

14. The method as recited in claim 1, wherein the value is related to recovery performance of system data.

15. The method as recited in claim 1, wherein the value is related to high availability requirements of system data.

16. The method as recited in claim 1, wherein the value is related to total cost of ownership ("TCO").

17. The method as recited in claim 1, wherein the value is related to recovery time objective ("RTO").

18. A system, comprising:
   a rules engine configured to:
   receive a set of rules, wherein each rule contains at least one criterion to be applied on staging of save sets, wherein each save set is a set of files, directories, and/or filesystems that a user defines for periodic backup and wherein each save set is associated with its own save set identification number (SSID); and
   determine a value of a specific save set on a specified device based at least in part on the set of rules;
   wherein the set of rules includes a rule that affects the value if an associated set of details for an associated time of analysis in a database indicates the specific save set has not been restored for a period of time;
   an analyzer coupled with the rules engine and configured to:
   analyze and store in a database data associated with a schema, wherein the schema comprises each time of analysis and associated set of details on when each stage-eligible save set was last recovered, wherein to analyze includes validating whether a given SSID may be staged;
   in the event the given SSID is validated and may be staged, stage a save set associated with the given SSID from a more expensive media to a less expensive media based at least in part on the value.

19. A computer program product, the computer program product being embodied in a non-transitory computer readable storage medium and comprising computer instructions for:
- receiving a set of rules, wherein each rule contains at least one criterion to be applied on staging of save sets, wherein each save set is a set of files, directories, and/or filesystems that a user defines for periodic backup and wherein each save set is associated with its own save set identification number (SSID);
- determining a value of a specific save set on a specified device based at least in part on the set of rules;
- analyzing and storing in a database data associated with a schema, wherein the schema comprises a time of analysis and a set of details on when each stage-eligible save set was last recovered, and wherein analyzing includes validating whether a given SSID may be staged;
- wherein the set of rules includes a rule that affects the value if an associated set of details for the associated time of analysis in the database indicates the specific save set has not been restored for a period of time; and
- in the event the given SSID is validated and may be staged, staging a save set associated with the given SSID from a more expensive media to a less expensive media based at least in part on the value.

* * * * *